April 21, 1970 L. J. WIEST 3,507,427
PROCESS FOR SCRAPLESS CUTTING OF SHEET MATERIAL
Original Filed Jan. 30, 1967 5 Sheets-Sheet 3
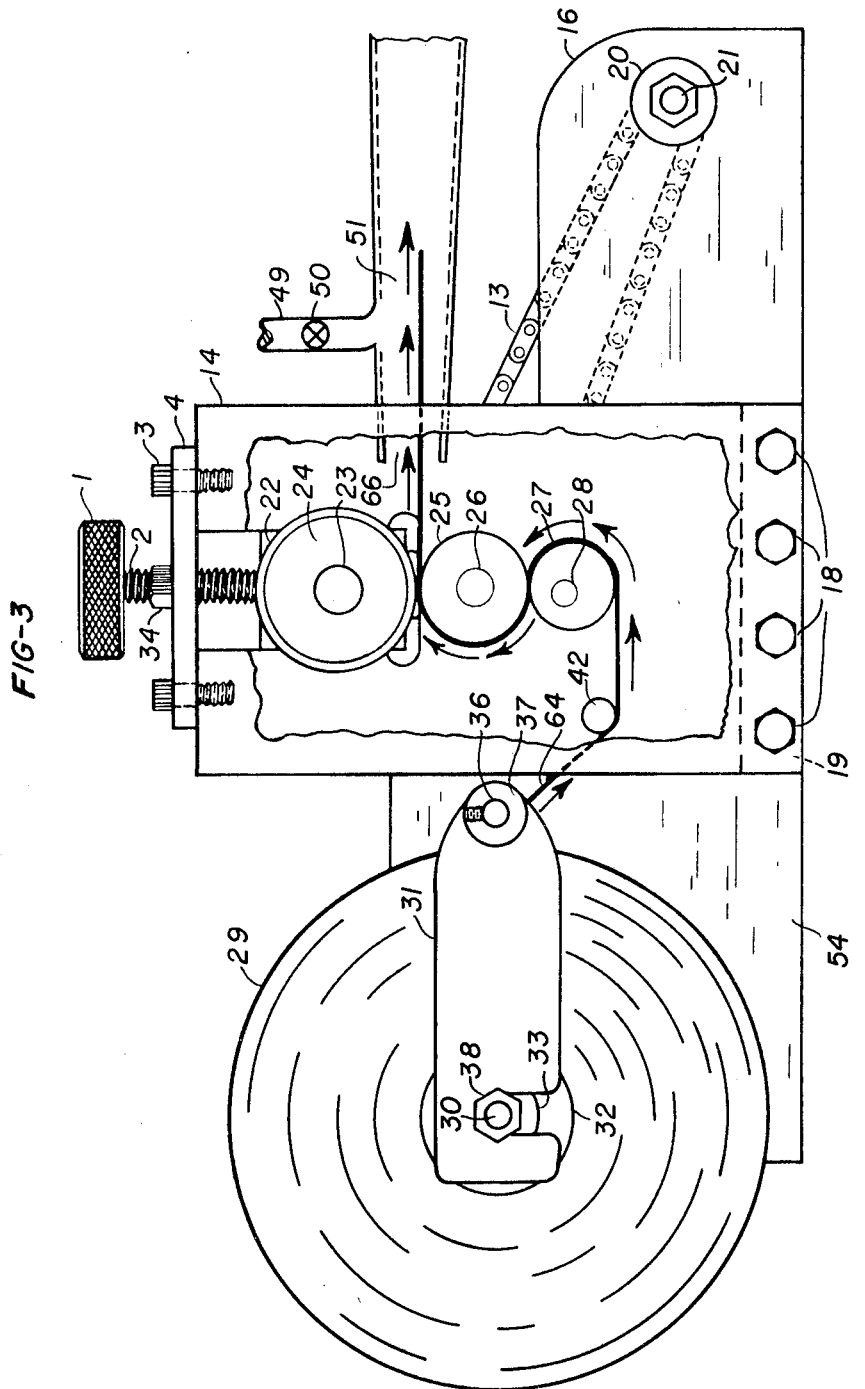
LEE JOHNSTON WIEST
by
ATTY.

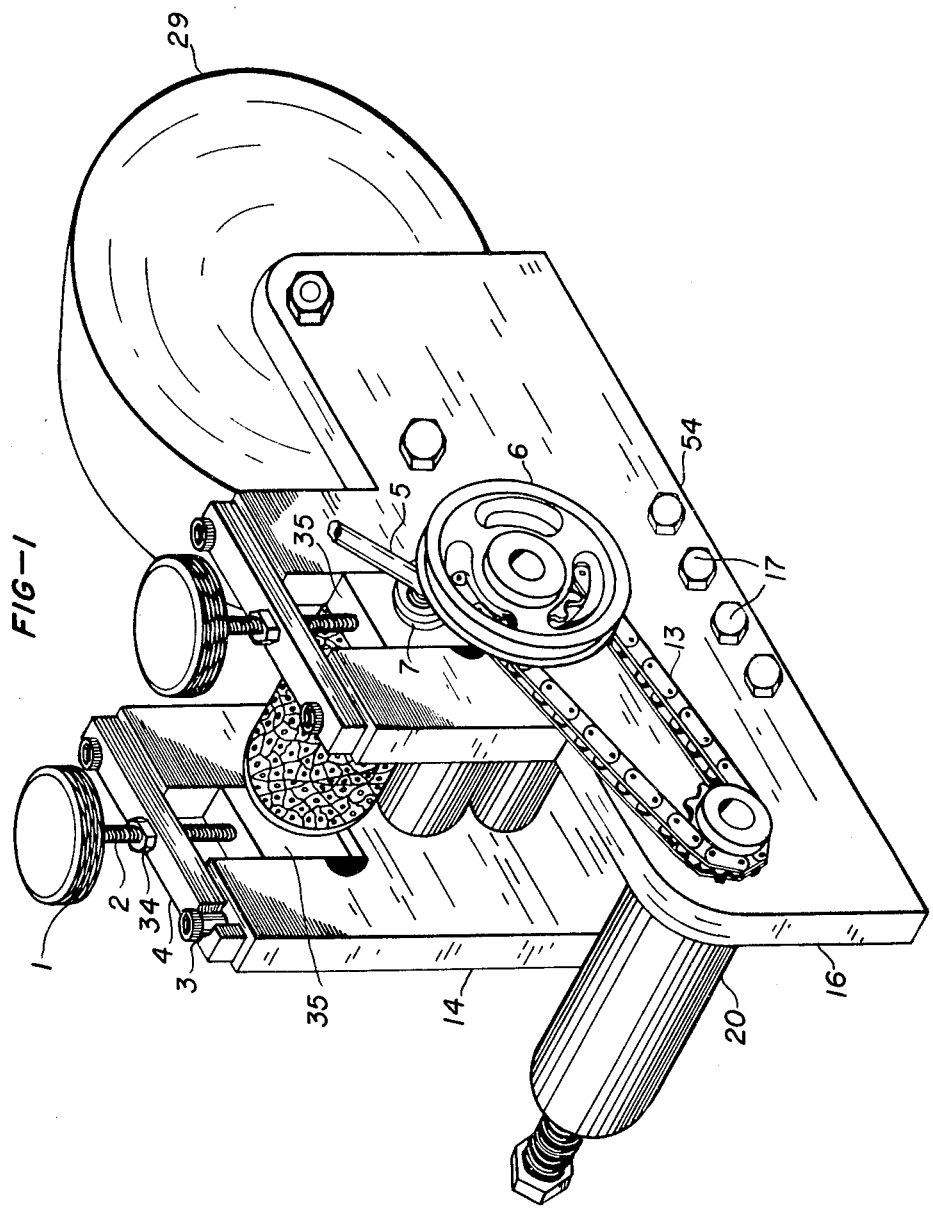

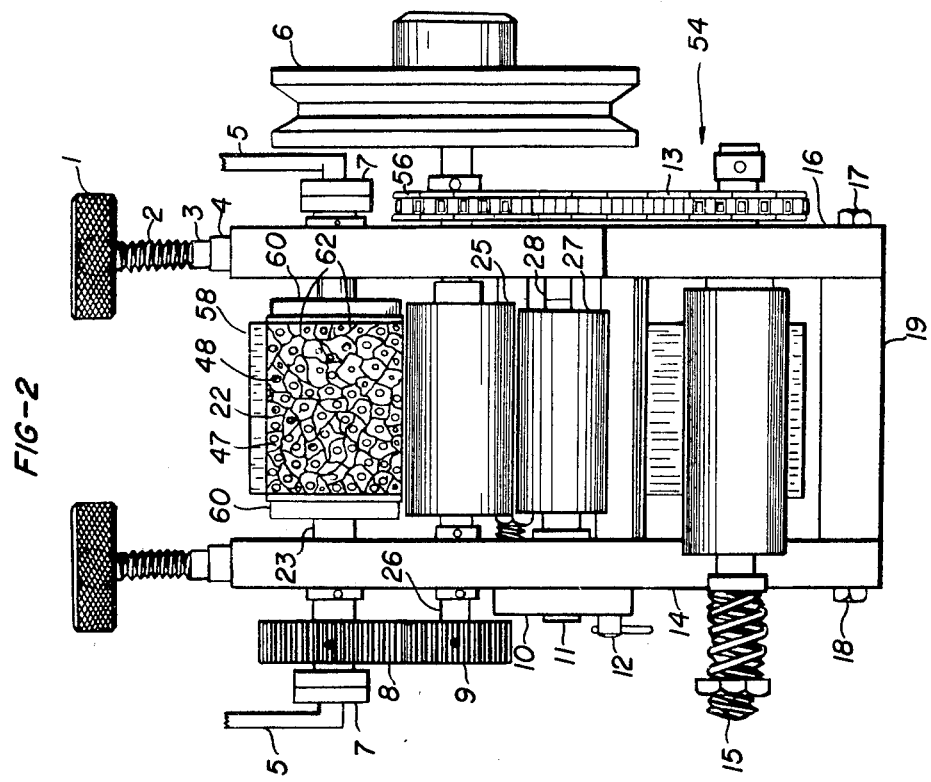

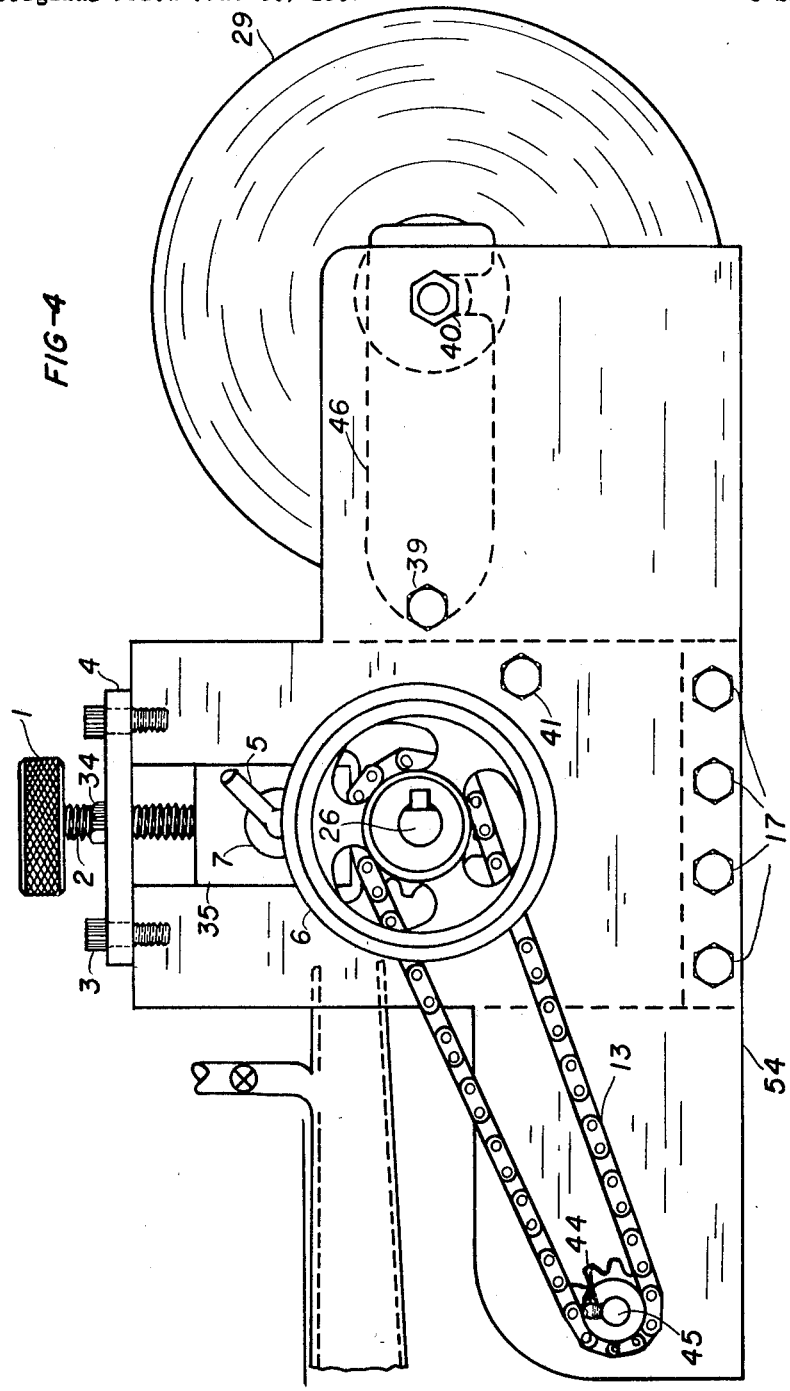

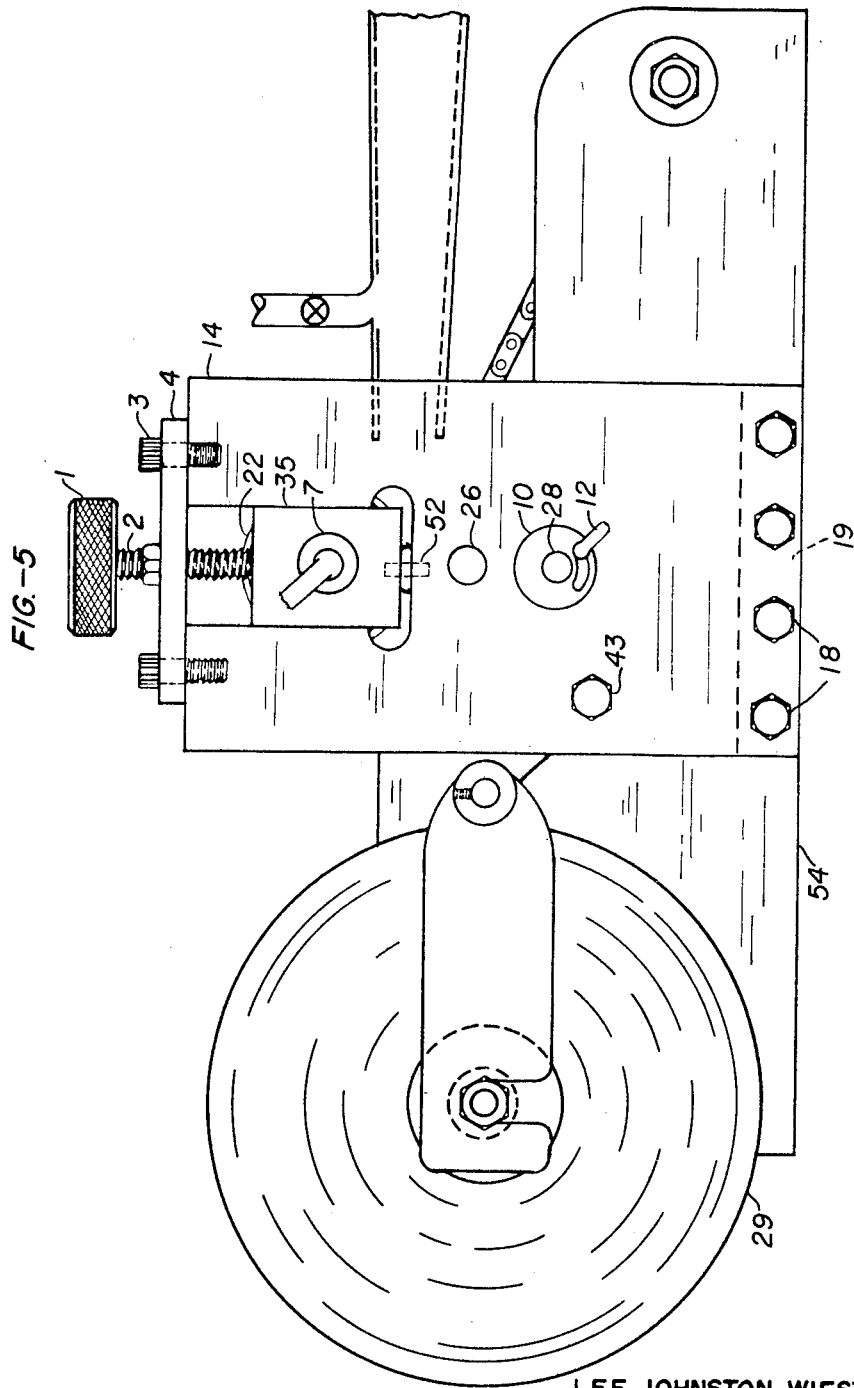

United States Patent Office 3,507,427
Patented Apr. 21, 1970

3,507,427
PROCESS FOR SCRAPLESS CUTTING OF SHEET MATERIAL
Lee J. Wiest, Downey, Calif., assignor to Torginol of America, Inc., Montebello, Calif., a corporation of California
Original application Jan. 30, 1967, Ser. No. 612,381. Divided and this application Feb. 26, 1969, Ser. No. 802,418
Int. Cl. B65h 35/10; B26f 3/02
U.S. Cl. 225—2                  5 Claims

ABSTRACT OF THE DISCLOSURE

An improved method for completely scrapless cutting of paper or other sheet material into a nongeometric fracture pattern is accomplished by passing the sheet material between a pattern rotary die and a backup roller until the sheet material is almost separated into a chip pattern and then subjecting the cut sheet material to a fluid pressure differential to complete severing the material into chips.

CROSS REFERENCE

This application is a division of applicant's copending United States patent application Ser. No. 612,381, filed Jan. 30, 1967.

SUMMARY OF INVENTION

The present invention relates to apparatus and process for completely scrapless cutting of paper or other sheet material into a nongeometric, fracture pattern wherein the sheet material is cut between a patterned rotary die and a backup roller, final separation of the cut sheet material being effected by an air blast from within the rotary die.

Chips of colored sheet material are widely used in the flooring industry for embedment within a clear plastic surface material, such as polyurethane or polyvinyl chloride. Such chips are of assorted colors. A nonrepeating fracture pattern to the chips is greatly preferred to a repeating geometric pattern. The only commonly used machinery or process for producing the chips is extremely expensive and not entirely satisfactory.

In accordance with present procedures, liquid material, commonly polyvinyl acetate, is poured onto Teflon belt conveyors in a thickness of .004–.007 mil. The material is dried or hardened by being carried on the belts under a series of heat lamps, moisture and mineral spirits being thereby removed. The partially dry film is carried by the conveyors to a hammer mill for fracturing, following which it is passed through a vibrator screen shaker for sizing and for further breakage.

Such present procedures result in undesirable shapes in highly irregular sizes with frequent foldovers and lumps, and with a great deal of waste. The sheet material is quite fragile, and, during shipping, a great deal of the material of the chips is broken up and reduced to powder. This not only is wasteful, but great care must be taken not to let any of the powder get into the final mix. Any powder that does get into the final mix, as well as lumps or folded pieces or chips, must be removed by hand, thus greatly increasing labor costs. Furthermore, the colors of such chips are rather subdued and are not sufficiently brilliant for the most favorable commercial acceptance.

In accordance with the present invention, paper or other stable sheet material is used for producing chips. Paper is cheap and readily handled, and can be manufactured in the most brilliant colors desired. It does not break up during shipping, and is inexpensive in cost.

Thus, it is an object of the present invention to provide an apparatus and process for cutting paper into chips in a fracture pattern.

Furthermore, it is an object of the present invention to cut paper or other sheet material into 100% scrapless chips.

Another object of the present invention is to cut paper or other sheet stock into chips between a cutting die and backup roller.

More specifically, it is an object of this invention to cut paper or other sheet stock between a rotary die and a backup roller, with the die and roller producing an imperfect through-cut, a differential of air pressure being utilized to finalize separation of the paper stock into chips.

Yet another object of the present invention is to provide a machine and process for producing chips of uniform thickness.

It is another object of this invention to provide a simple apparatus and process for severing sheet stock into chips of controlled pattern and size.

Considered in its broadest aspects, it is an object of the present invention to provide a simplified apparatus and method for the continuous complete separation of a moving sheet of material into chips.

Other and further objects and advantages of the present invention will be apparent from the following description when taken in connection with the accompanying drawings wherein:

FIGURE 1 is a perspective view of the chip forming apparatus constructed in accordance with the present invention;

FIGURE 2 is a vertical elevation taken from the left side of FIGURE 1;

FIGURE 3 is a vertical elevation taken from the rear of FIGURE 1, and partly in longitudinal section;

FIGURE 4 is a front elevation; and

FIGURE 5 is another rear elevation similar to FIGURE 3, but omitting the section.

Referring now in greater particularity to the drawings, there is shown a machine for producing chips in accordance with the present invention identified generally by the numeral 54 and including a main machine housing base 19 having a left-hand main machine housing frame 14 and a right-hand main machine housing frame 16 secured to the main machine housing base by main housing cap screws 17 and 18. A resilient backup roller shaft 26 is journaled in the housing frame side members by any known or suitable bearings, and extends from one side thereof carrying a drive pulley 6 which is driven by a belt from any suitable source of motive power, preferably a variable speed electric motor. A chain drive sprocket 56 is also provided on the shaft 26 between the pulley 6 and the adjacent frame side member 16, and this will be referred to later. A resilient backup roller 25 is fixed to the shaft 26 between the side frame members 14 and 16, and turns with the shaft. The backup roller is of a resilient, yet tough, material, and a preferred material is the plastic material known commercially as "Teflon" plastic (polytetrafluoroethylene).

The opposite end of the backup roller shaft 26 carries a drive gear 9 on the outside of the side frame member 14. The drive roller 9 meshes with a cutter roller die drive gear 8 fixed on a hollow shaft 23, which otherwise might be denominated as a cutter roller shaft and air receiver mandrel. This shaft is journaled by means of any suitable bearings adjacent its opposite ends in cutter roller bearing blocks 35 received in suitable notches or cutouts in the side frame members 14 and 16, and this may be with a vertical tongue and groove joint or other suitable guide means, if so desired. The blocks 35 are held down by pressure adjustment screws 2, each having a pressure adjustment knob 1 with a knurled periphery. The screws 2 are threaded through strongback bars 4 spanning the upper portions of the frame side members 14 and 16, and held in place by strongback lock screws 3. Each of the pressure adjustment screws 2 has a lock nut 34 thereon for locking the screw in adjusted position.

The hollow shaft 23 is provided at its opposite ends with rotating unions 7 connecting the shaft to compressed air inlet pipes 5. It will be understood that compressed air inlet pipes and unions at both ends of the shaft 23 will not in every instance be necessary, but are provided to equalize pressure across the length of the shaft.

Mounted on the hollow shaft 23 and in open fluid communication therewith is a most important part of the invention, namely the rotary cutter 58. The rotary cutter comprises a pair of cylindrical end members or plugs 60 having portions (not shown) extending within and mounting a cutter die sleeve 22. The sleeve 22 is provided with a multiple or complex continuous edge, intersecting blade 62 in a fracture pattern, having blade roots 47 in amongst the various portions of the blade 62, there being an aperture 48 extending radially from the hollow interior of the sleeve 22 into each blade root. Thus, when air under pressure is supplied through the pipes 5, it continuously blows out through the apertures 48.

The cutter roller die sleeve is made of steel, and the blades and blade roots thereon are formed by a known photo-etching process. In order to produce the pattern, I fractured a sheet of brittle vinyl plastic material with knives, put the pieces back together like a jig-saw puzzle, and photographed them. The die, being hollow, is, with the end plugs 60, in the nature of an air receiver 24, and it will be appreciated that with air blowing from it radially through the large number of apertures 48, it is sometimes necessary to provide pressure at both ends, through the two pipes 5 to prevent any pressure drop from one end to the other.

The die sleeve 22 is replaceable to produce different fracture patterns. The precise manner of replacement is not critical to the present invention, but it will be appreciated that the pressure adjustment screws 2 and knobs 1 allow the blocks 35 to be moved up or down to hold any die sleeve in proper tight engagement against the backup roller 25.

A friction feed or infeed roller 27 is mounted directly beneath the resilient backup roller 25, and substantially in engagement therewith. This roller preferably has a rubber surface, and is mounted on a shaft 28 having a shaft extension 11 extending beyond the left hand machine housing frame 14 and received in an eccentric friction roller adjustment mechanism 10 of known design, having an adjustment lock 12 whereby the friction feed roller 27 may be toward or away from the backup roller 25. As will be appreciated, there is a generally similar mounting of the shaft 28 in the right-hand housing frame to permit eccentric adjustment of the shaft. However, locking at that end is not necessary.

The roll of stock material 29, paper on the order of 5 or 6 mils thickness being a preferred example, is mounted on a material roller carrier shaft 30 between material guides 31, the material being mounted on a core center 32 and cooperating with a material carrier roller 33. Material carrier roller shaft nuts 38 lock the carrier shaft 30 in place when a roll of material has been inserted.

The material guides 31 are carried on a material guide bar shaft 36 having a lock ring 37, whereby the material guide 31 is supported from the main machine housing frame member 16. The shaft 30 further is supported from the member 16 by means of a material guide 46 secured adjacent the frame member 16 with a material guide bar shaft nut 37. The material roller carrier shaft 40 is on the end of the shaft 30 adjacent the frame member 16.

A lead bar shaft 42 (FIGURE 3) is secured to the side frame member 14 by a lead bar shaft nut 43 and to the frame member 16 by a lead bar shaft nut 41.

As best may be seen in FIGURE 3, material 64 passes from the roll 29 under the guide bar shaft 36 and under the lead bar shaft 42, and then continues under the friction feed or infeed roller 27, around this roller between it and the resilient backup roller 25, and over the top of the resilient backup roller 25 (in a generally S-shaped configuration) where it is cut against the resilient backup roller by the blades 62 of the cutting die 58. Note that the gear drive of the backup roller and cutting die prevents any slippage between these two parts at the critical cutting area which might cause tearing of the paper or other material. Although the cut is almost completely through the material, the material is not completely severed by the cutting blade or blades. Separation or severance is completed by the air blasts or jets through the apertures 48. The air jets also remove the paper from the die.

The breaking up material is received by an air syphon chamber 51 having an inlet end 66 positioned quite close to the cutting area between the die 58 and backup roller 25. Air enters this chamber 51 with a syphon effect from an air inlet line 49 through an air regulating valve 50. Although the chips are generally well separated by the time they pass into the air syphon chamber, it will be appreciated that any chips that are not completely severed previously are separated by the agitation of the chips as they are pneumatically conveyed through the air syphon chamber. From the air syphon chamber the chips pass directly into shipping containers (not shown).

Mention has been made heretofore of the possibility of mounting the cutter roller bearing blocks 35 by means of a tongue and groove guideway. In the present instance this is unnecessary, since (see FIGURE 5) a housing bearing dowel block and cushion pin 52 is provided beneath the blocks and extends into the blocks and into the housing frame members 14 and 16. Movement of these blocks up or down allows use of paper stock of different thicknesses with a desired pressure engagement maintained between the cutting die and the backup roller.

In accordance with the apparatus as illustrated to this point, the paper or other sheet stock roll 29 has an axial dimension of a few inches, and a diameter of several inches. The total weight of the roll is on the order of 40 to 50 pounds for easy handling. However, it will be appreciated that there may be instances in which it is desired to provide a larger amount of stock material for continuous operation to produce chips of a single color. For such purposes I have provided an auxiliary guide roller 20 mounted from the right hand housing frame member 16 on an auxiliary guide roller shaft 21 mounted in this member by any suitable bearings. The shaft is provided with an auxiliary drive shaft cog or gear 44 driven by a chain 13 from the cog or gear 56 on the backup roller shaft 26. An auxiliary guide roller adjustment screw and spring 15 are provided on the outer end of the shaft 45. As will be appreciated, sheet material can be passed in over the roller 20 to the friction feed roller 27 and in the same general path thereafter through the cutting position.

I have found that with some materials and at slow speed operation the air blast may not be essential to complete severance of the material. However, such low speeds are not commercially acceptable, and the air blast therefore forms an essential part of the operation when chips are formed at a commercial rate.

In some instances I contemplate the use of materials other than paper for formation of the chips, and, for example, pigmented urethene chips are highly desirable. Such urethene chips are generally not completely severed by the fracturing roller or cutting die and the air blast therefrom, and an additional guide roller is sometimes necessary to carry the material into the air syphon chamber where final fragmentation is completed by the agitated conveyance of the material therein.

The machine as herein illustrated is only a few feet in length and less than a foot in width. Nevertheless, it is capable of producing 200 to 250 pounds of chips per hour, thus rendering it fully competitive with present systems requiring conveyor belts several feet in width and totaling perhaps 100 feet in length, thereby requiring extensive and expensive floor space and supervision by more than one workman. Indeed, one man can supervise several machines simultaneously in accordance with the present invention, thereby materially reducing labor cost relative to prior art machines.

In accordance with one specific example of the present invention, the cutting die or roller is three inches in axial length and has a circumference of eight inches. With the cutting die turning at half speed (i.e., operating at one-half of its maximum capacity), namely 1000 r.p.m., it will cut approximately 10,000 square feet per hour of paper or other material into chips. A typical paper weighs about one pound for 40 square feet.

I have found that better results and easier replacement are sometimes found by using a solid (metal) roller for the backup roller 25 and passing a resilient belt, such as of Teflon, over this roller and over a smaller idler roller spaced to the out-feed side of the cutting die and backup roller.

The specific example of the machine as herein shown and described will be understood as being for illustrative purposes only.

I claim:

1. The process of producing chips from sheet stock material which comprises the steps of cutting sheet material almost apart in chip pattern, while simultaneously subjecting the cut sheet stock material to a fluid pressure differential in order substantially to complete severing of said material along each cut in order to produce chips.

2. The process of producing chips as set forth in claim 1 wherein the step of subjecting the cut sheet stock material to a fluid pressure differential comprises subjecting the cut sheet material to pneumatic jet means.

3. The process of producing chips as set forth in claim 2 in which the step of subjecting the sheet stock material to a fluid pressure differential comprises subjecting the sheet material to a plurality of jets, there being one jet for each chip.

4. A process for producing chips from sheet stock material comprising the steps of cutting the sheet stock material apart in chip pattern and subjecting the cut sheet material to a fluid pressure differential in order to complete the severing of the material into chips, with the step of subjecting the cut sheet stock material to a fluid pressure differential comprising conveying the material by a fluid pressure differential.

5. The process of producing chips as set forth in claim 4, wherin the step of subjecting the cut sheet material to a fluid pressure differential comprises subjecting the sheet material to a plurality of jets, there being one jet for each chip.

References Cited

UNITED STATES PATENTS 2,757,585   8/1956   Wenzel _____ 93—36

FOREIGN PATENTS 42,920   7/1910   Austria.

JAMES M. MEISTER, Primary Examiner

U.S. Cl. X.R.

225—96